United States Patent [19]

Hidaka et al.

[11] Patent Number: 4,922,346
[45] Date of Patent: May 1, 1990

[54] AUTOMATIC FOCUSING APPARATUS HAVING A VARIABLE FOCUSING SPEED AND PARTICULARLY SUITED FOR USE WITH INTERLACED SCANNING

[75] Inventors: Masaru Hidaka, Nara; Hirotsugu Murashima, Yamatotakada; Masao Takuma, Toyonaka; Toshinobu Haruki, Shijonawate; Kenichi Kikuchi, Osaka, all of Japan

[73] Assignee: Sanyo Electric Co., Ltd., Japan

[21] Appl. No.: 211,434

[22] Filed: Jun. 24, 1988

[30] Foreign Application Priority Data

Jun. 30, 1987 [JP] Japan ............................. 62-164382
Apr. 20, 1988 [JP] Japan ............................. 63-97312

[51] Int. Cl.$^5$ ........................................... H04N 5/232
[52] U.S. Cl. .................................... 358/227; 358/228
[58] Field of Search ............... 358/227, 228, 105, 126

[56] References Cited

U.S. PATENT DOCUMENTS

| 4,531,158 | 7/1985 | Murakami et al. | 358/227 |
| 4,614,975 | 9/1986 | Kaite | 358/227 |
| 4,638,364 | 1/1987 | Hiramatu | 358/227 |

FOREIGN PATENT DOCUMENTS

| 58-505 | 4/1983 | Japan . |
| 103776 | 6/1985 | Japan . |
| 12177 | 1/1986 | Japan . |
| 61-41277 | 2/1986 | Japan . |
| 195084 | 8/1986 | Japan . |
| 62-60369 | 3/1987 | Japan . |
| 163475 | 7/1987 | Japan . |

Primary Examiner—James J. Groody
Assistant Examiner—Robert M. Bauer
Attorney, Agent, or Firm—Peter L. Michaelson

[57] ABSTRACT

In an automatic focusing apparatus of a video camera, a first focus evaluating value which steeply changes and a second focus evaluating value which gently changes relative to the position of a lens, are detected in response to a video signal obtained in an image sensing circuit (4). A switching circuit (19) alternately selects the first and second focus evaluating values every one field to apply the same to in-focus state detecting circuits (20, 21), respectively. The in-focus state detecting circuits (20, 21), together with a focusing motor control circuit (10), perform an automatic focusing operation by hill-climbing control. In addition, a calculating circuit (22) calculates the relative ratio of the first focus evaluating value to the second focus evaluating value. The focusing motor control circuit (10) sets the rotational speed of a focusing motor (3) to a normal speed when the calculated relative ratio is smaller than a predetermined value while setting the rotational speed of the focusing motor (3) to a low speed when it is larger than the predetermined value. Therefore, a lens (1) is moved at low speed when the focusing lens is in the vicinity of the in-focus position while being moved at high speed when it is in the defocused state.

22 Claims, 8 Drawing Sheets

AUTOMATIC FOCUSING APPARATUS HAVING A VARIABLE FOCUSING SPEED AND PARTICULARLY SUITED FOR USE WITH INTERLACED SCANNING

BACKGROUND OF THE INVENTION

1. Field of the Invention

The present invention relates generally to an automatic focusing apparatus, and more particularly, to an improvement of an automatic focusing-apparatus for automatically matching the focus relative-to an object in response to a video signal obtained from an image sensor, in an image sensing apparatus such as a video camera having an automatic focusing mechanism.

2. Description of the Prior Art

Conventionally, in an automatic focusing apparatus used in an image sensing apparatus such as a video camera, an approach utilizing a video signal itself obtained from an image sensor for evaluating the state in which the focus is controlled has been developed. According to such an approach, several good characteristics can be obtained. For example, there exists substantially no parallax. In addition, even if the depth of field is small and an object is located in the distance, the focus can be exactly matched. Furthermore, according to this approach, a specific sensor for automatic focusing need not be separately provided, so that the apparatus is very small as a mechanism.

As one example of such a focus control method utilizing a video signal, a control method referred to as a so-called hill-climbing servo system has been conventionally known. The hill-climbing servo system is described in, for example, U. S. Pat. Nos. 4,638,364 and 4,614,975 and Japanese Patent Laying-Open Gazette-Nos. 58505/1983 and 103776/1985. Briefly stated, a high frequency component of a video signal obtained from an image sensor is detected every one field as a focus evaluating value, the detected focus evaluating value is always compared with a focus evaluating value detected one field before, and the position of a focusing lens continues to be slightly vibrated such that the focus evaluating value always takes the maximal value.

In the above described hill-climbing servo system, if only the slope of a focus evaluating value is detected, the focusing lens is not stopped in the defocused position by driving the focusing lens in the direction of always increasing the focus evaluating value even if the object is changed, so that very good follow-up characteristics can be achieved.

Additionally, an automatic focusing apparatus having improved performance is proposed by one of the inventors of the present invention, which is disclosed in Japanese Patent Application No. 62-49512 filed Mar. 4, 1987.

Figure 1:
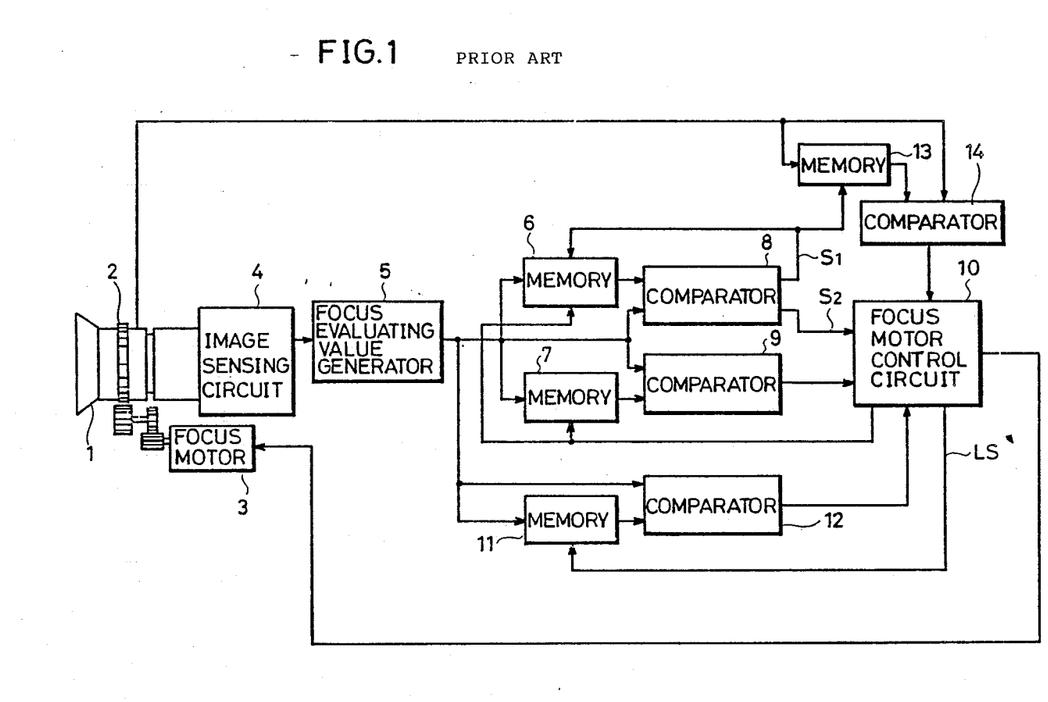
FIG. 1 is a schematic block diagram showing a conventional automatic focusing apparatus.
Figure 2:
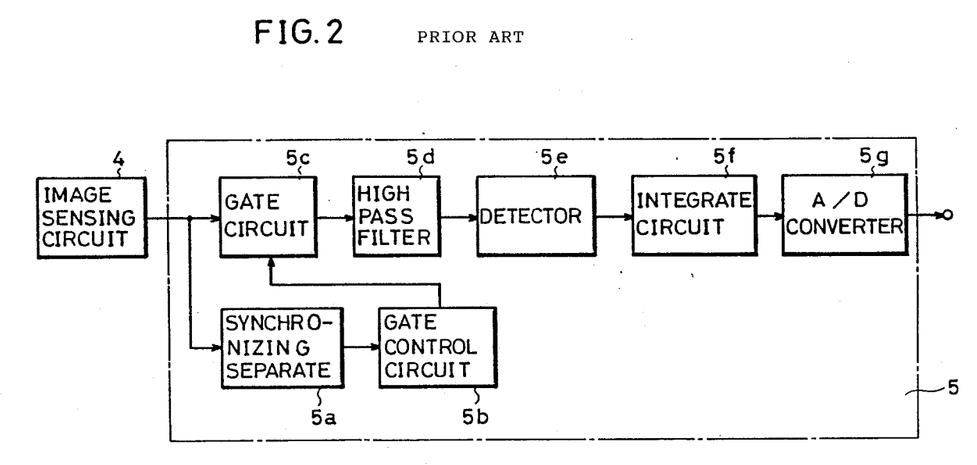
FIG. 2 is a block diagram showing the details of a focus evaluating value generating circuit shown in FIG. 1.

FIG. 1 is a schematic block diagram showing the proposed automatic focusing apparatus, and FIG. 2 is a block diagram showing the details of a focus evaluating value generating circuit shown in FIG. 1.

In FIG. 1, a video camera comprises a focusing ring 2 for moving a focusing lens 1, a focusing motor 3 for driving the focusing ring 2, and an image sensing-circuit 4 including an image sensor (not shown) such as CCD (Charge Coupled Device). The focusing-lens 1 may be moved by a piezoelectric element instead of a motor. In addition, the image sensor not shown) itself such as the CCD instead of the focusing lens may be moved by the piezoelectric element.

An image formed on a surface of the image sensor by the focusing lens 1 is converted into a video signal by the image sensing circuit 4 and inputted to a focus evaluating value, generating circuit 5. Referring to FIG. 2 showing the details of the focus evaluating value generating circuit 5, a luminance signal component in a video signal outputted from the image sensing circuit 4 is applied to a synchronizing separator circuit 5a and a gate circuit 5c. The synchronizing separator circuit 5a separates a vertical synchronizing signal VD and a horizontal synchronizing signal HD from the inputted luminance signal, to apply the same to a gate control circuit 5b. The gate control circuit 5b sets a rectangular sampling area in a central portion of a picture in response to the inputted vertical synchronizing signal VD and horizontal synchronizing signal. HD and a fixed output of an oscillator,(not shown). The gate control circuit 5b applies a signal for opening or closing a gate every field to the gate circuit 5c such that passage of the luminance signal is permitted only in the range of the sampling area. The gate circuit 5c may be provided anywhere in the former stage of an integration circuit 5f as described below.

Only the luminance signal corresponding to the range of the sampling area is applied to a high-pass-filter. 5d every field by the gate circuit 5c. A high frequency component of the video signal separated by the high-pass filter 5d is amplitude-detected by a detector 5e, the detected output being applied to the integration circuit 5f. The integration circuit 5f integrates every field the detected output applied thereto, the integrated output being applied to an A/D converter 5g. The A/D converter 5g converts the integrated value inputted thereto into a digital value, to apply the digital value as a focus evaluating value in the current field.

Description is now made on an operation to occur immediately after automatic focusing-control is started. Immediately after an automatic focusing operation is started, a focus evaluating value corresponding to the first one field outputted from the, focus evaluating value generating circuit 5 is first applied to a memory 6 holding the, maximum value and a memory 7 holding the initial value, to be held therein. Thereafter, a focusing motor control circuit 10 rotates the focusing motor 3 in a predetermined direction. Thereafter., a comparator 9 compares the initial focus evaluating value held in the initial value memory 7 with the current focus evaluating value outputted from the focus evaluating value generating circuit 5, to generate a comparison-signal. Accordingly, the focusing motor control circuit 10 initialize the rotational direction of the focusing motor 3 in response to the comparison signal.

More specifically, the focusing motor control circuit 10 rotates the focusing motor 3 in the above described predetermined direction until the comparator 9 generates a comparison output indicating "large" or,"small". If and when a comparison output indicating that the current focus evaluating value is larger than the initial focus evaluating vale held in the initial value memory 7 is outputted from the comparator 9, the focusing motor control circuit 10 maintains the above described predetermined rotational direction. On the other hand, when a comparison output indicating-that the current focus evaluating value is smaller than the initial focus evaluating value is obtained, the focusing motor control circuit 10 reverses the rotational direction of the focusing motor 3.

In the above described manner, initialization of the rotational direction of the focusing motor 3 is completed. Thereafter, the focusing motor control circuit 10 monitors an output of a comparator 8. In order to prevent a malfunction due to noise of the focus evaluating value, the comparator 9 may be adapted not to generate the comparison output indicating "large" or "small" while the difference between the initial focus evaluating value and the current focus evaluating value does not exceed a predetermined threshold value.

On the other hand, the comparator 8 compares the maximum focus evaluating value so far held in the maximum value memory 6 with the current focus evaluating value outputted from the focus evaluating value generating circuit 5, to output two kinds of comparison signals (S1, S2), that is, signals in first and second mode-in which the current focus evaluating value is larger or is decreased to be below a predetermined threshold value, as compared with the focus evaluating value held in the maximum value memory 6, respectively. If and when the current focus evaluating value is larger than the content of the maximum value memory 6, the content of the maximum value memory 6 is updated in response to the output S1 of the comparator 8, so that the maximum value of the focus evaluating value so far is always held in the maximum value memory 6.

A signal indicating the position of a focusing ring is generated from the focusing ring 2 corresponding to the position of the focusing ring 2 supporting the focusing lens 1 and applied to a memory 13 holding the position of a focusing ring. The focusing ring position memory 13 is updated in response to the output of the comparator 8 such that the focusing ring position signal in which the focus evaluating value becomes the maximum is always held The focusing motor control circuit 10 monitors the output of the comparator 8 while rotating the focusing motor 3 in the direction initialized in response to the output of the comparator 9 as described above. When the comparison output S2 in the second mode in which the current focus evaluating value is decreased to be below the above described threshold value, as compared with the maximum focus evaluating value is obtained from the comparator 8, the focusing motor control circuit 10 reverses the rotational direction of the focusing motor 3. It is to prevent a malfunction due to noise of the focus evaluating value that the focusing motor 3 is not reversed until the current focus evaluating value is decreased to be below a predetermined threshold value.

After the focusing motor, 3 is reversed a comparator 14 compares the content of the focusing ring-position memory 13 corresponding to the maximum value of the focus evaluating value with the current focusing ring position signal generated from the focusing ring 2. When both coincide with each other, that is, the focusing ring. 2 is returned to the position, where the focus evaluating value is the maximum, the focusing motor control circuit 10 stops rotation of the focusing-motor 3. At the same time the focusing motor control circuit 10 outputs a lens stop signal LS. In the above described manner, a series of automatic focusing operations are completed.

A memory 11 and a comparator 12 are circuits for resuming an automatic focusing operation by the focusing motor control circuit 10 if the focus evaluating value is changed by more than a predetermined threshold value while the focusing lens is stopped. More specifically, a focus evaluating value at the time point when the automatic focusing operation by the focusing motor control circuit 10 is terminated so that the lens stop signal LS is generated is held in the memory 11. The comparator 12 compares, the content of the memory 11 with the current focus evaluating value outputted from the focus evaluating value generating circuit 5. If the difference therebetween exceeds the predetermined threshold value it is considered that an object changed, so that the signal indicating that an object changed is applied to the focusing motor control. circuit 10. As a result, the automatic focusing operation by the focusing-motor control circuit 10 is resumed, so that an automatic focusing operation following the change of the object can be achieved.

However, the above described automatic focusing apparatus suffers from the following two disadvantages.

The first disadvantage is that since the rotational speed of the focusing motor 3 can not be increased, it is difficult to achieve a high-speed automatic focusing operation.

Figure 3:
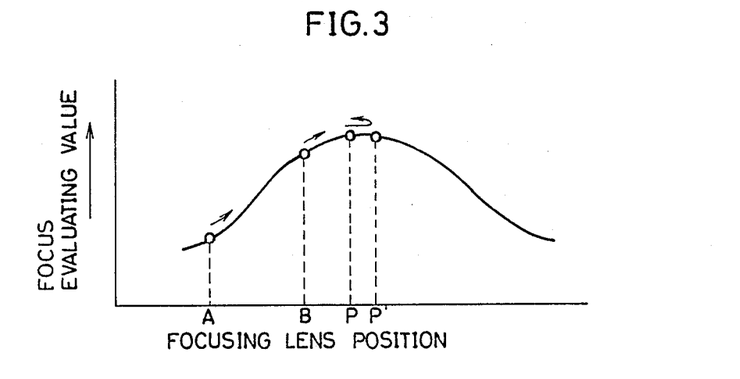
FIG. 3 is a graph showing the relation between the position of a lens in the automatic focusing apparatus shown in FIG. 1 and a focus evaluating value.

FIG. 3 is a graph showing the relation between the position of the lens (the distance between lens and the object) in the automatic focusing apparatus shown in FIG. 1 and the focus evaluating value. Referring now to FIG. 3, description is made in detail on the above described first disadvantage. In FIG. 3, an axis of abscissa represents the position of the lens and an axis of ordinate represents the focus evaluating value.

In FIG. 3, it is assumed that the automatic focusing operation is started in the state in which the lens is in a position A considerably spaced apart from an in-focus position P on the side of the object. In this case, the focusing motor 3 rotates in the direction of increasing the distance between the lens and the, object from the position A where the focus evaluating value is small and the object is significantly defocused, so that the focus evaluating value rapidly rises. When the lens reaches, the vicinity of a position B of the lens, the focus evaluating value gently rises. In addition, the lens passes through the in-focus position P, to reach a position P of the lens where the focus evaluating value falls below the above described threshold value. Thereafter, the lens is returned from the position P of the lens to the in-focus position P, to be stopped.

It is required that such a sequence of automatic focusing operations are performed at high speed. However, if the time which each comparator requires for comparison is reduced, a malfunction is liable to occur. Thus, the automatic focusing operations can be achieved substantially by moving the lens 1 by the focusing motor 3 at high speed, i.e., rotating the focusing motor 3 at high speed. However, in the process of the above- described movement of the lens from the position B to the position P through the position P', the change of the focus evaluating value is very small, so that it is inevitable that overrun occurs due to the inertia of the motor itself when the motor is reversed in the position P' of the lens or the motor is stopped in the position P of the lens. The higher the rotational speed of the focusing motor 3 is, the larger this overrun becomes. As a result, the time is rather required until the lens reaches the in in-focus position P. Thus, in the conventional automatic focusing-apparatus in which the rotational speed of the focusing motor 3 is always held constant as described above, the rotational speed of the focusing motor 3 can not be set too high, so that a high-speed automatic focusing operation can not be performed.

A second disadvantage is the change of the focus evaluating value caused by interlaced scanning. More specifically, in the above described conventional automatic focusing apparatus, the position of the lens is controlled such that a focus evaluating value obtained from a level of a high frequency component in a video signal is always maximum. However, since the video signal obtained from an image sensor is ordinarily subject to interlaced scanning, the positions of an even field and an odd field constituting one picture are shifted within the picture by one scanning line. Consequently, even if the same object continues to be recorded, the focus evaluating value changes every one field, so that the position of the lens where the focus evaluating value is the maximum becomes unclear.

SUMMARY OF THE INVENTION

Therefore, an object of the present invention is to provide an automatic focusing apparatus which can perform an automatic focusing-operation at high speed.

Another object of the present invention is to provide an automatic focusing apparatus which can perform hill-climbing control without any loss by setting the speed of movement of the relative position of a focusing lens depending on the degree of defocusing.

Still another object of the present invention is to provide an automatic focusing apparatus which can prevent the change of a focus evaluating value caused by interlaced scanning and precisely detect the position of a focusing lens where the focus evaluating value is the maximum.

Briefly stated, the present invention is directed to an automatic focusing apparatus for automatically matching the focus in response to a video signal obtained from an image sensor, the automatic focusing apparatus comprising first focus evaluating value detecting means for detecting a level of a high frequency component of the video signal every constant time period and converting the level into a first focus evaluating value which steeply changes in response to the change of the relative position of a focusing lens to supply the same, second focus evaluating value detecting means for converting the level into a second focus evaluating value which gently changes to supply the same, control means for controlling the relative position of the focusing lens to the in-focus position, and calculating means for calculating the relative ratio of the first focus evaluating value to the second focus evaluating value. The calculated relative ratio is compared with a predetermined value. The speed of movement of the relative position of the focusing lens is set in response to the result of comparison.

In accordance with another aspect of the present invention, the automatic focusing apparatus comprises third focus evaluating value detecting means responsive to the first and second focus evaluating values for generating a third focus evaluating value which takes a maximum value in the in-focus position, and where the control means controls the relative position of the focusing-lens to the position where the third focus evaluating value takes the maximum value.

In accordance with still another aspect of the present invention, the third focus evaluating value detecting means comprises switching means for alternately selecting every constant time period the first and second focus evaluating values respectively outputted from the first and second focus evaluating value detecting means to output the same as the third focus evaluating value In accordance with yet another aspect of the present invention, the third focus evaluating value detecting means comprises switching means for alternately selecting every constant time period the first and second focus evaluating values respectively outputted from the first and second focus evaluating value detecting means, a first memory for holding the first focus evaluating value selected by the switching means, a second memory for holding the second focus evaluating value selected by the switching means, and an adder for adding the newest contents of the first and second memories every constant time period to output a value obtained by addition as the third focus evaluating value.

In accordance with a further aspect of the present invention, the automatic focusing apparatus for automatically matching the focus in response to a video signal obtained from an image sensor comprises focus evaluating value detecting means for detecting a level of a high frequency component of the video signal every constant time period and converting the level into a focus evaluating value which takes the maximum value in the in-focus position to sequentially supply the same focus evaluating value adding means for adding every constant time period continuous two focus evaluating values obtained every constant time period to sequentially supply a focus evaluating value obtained by addition, and control means responsive to the focus evaluating value obtained by addition for controlling the relative position of a focusing lens.

Thus, a principal advantage of the present invention is that the degree of defocusing of an object is detected in the relative ratio of the first focus evaluating value to the second focus evaluating value which is the normalized quantity of state, and response characteristics of an automatic focusing operation is set in response to the detected degree of defocusing, so that a high-speed and stable automatic focusing operation can be achieved.

Another advantage of the present invention is that the number of times of sampling for monitoring the maximum values of focus evaluating values can be satisfactorily ensured even if video components in different bands are used as the focus evaluating values, so that precise hill-climbing control can be performed.

Still another advantage of the present invention is that continuous two focus evaluating-values obtained every constant time period are added every constant time period and a focus evaluating value obtained by addition is updated every constant time period, so that a higher precision focus evaluating value can be obtained without being affected by interlaced scanning.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 4:
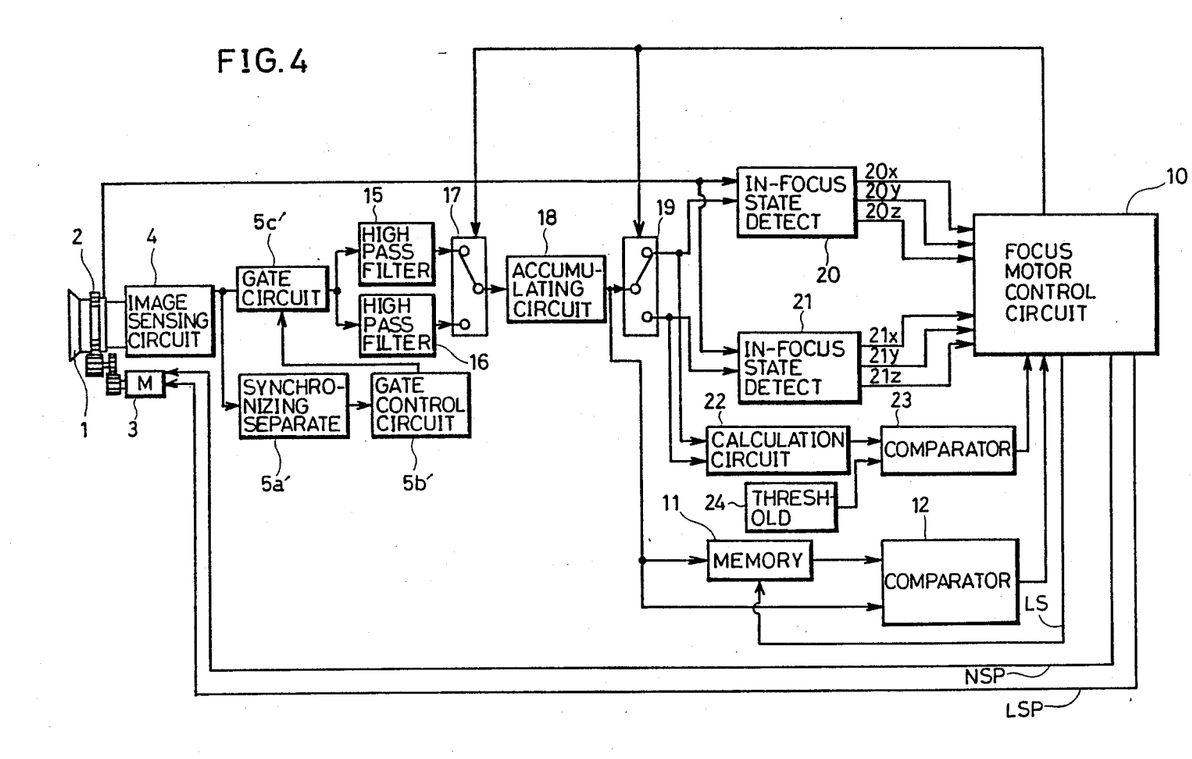
FIG. 4 is a schematic block diagram showing an automatic focusing apparatus according to a first embodiment of the present invention.

FIG. 4 is a schematic block diagram showing-an automatic focusing apparatus according to an embodiment of the present invention.

Referring now to FIG. 4, description is made on an automatic focusing apparatus according to an embodiment of the present invention. In FIG. 4, a video camera comprises a focusing ring 2 for moving a focusing lens 1, a focusing motor 3 for driving the focusing ring 2, and an image sensing circuit 4 including an image sensor (not shown) such as a CCD, as in the conventional example shown in FIG. 1. The focusing lens 1 may be moved by a piezoelectric element instead of a motor. In addition, the image sensor (not shown) itself such as the CCD instead of the focusing lens may be moved by the piezoelectric element. An image formed on the image sensor by the focusing lens 1 is converted into a luminance signal by the image sensing circuit 4, to be applied to a synchronizing separator circuit 5a' and a gate circuit 5c'. The synchronizing separator circuit 5a' corresponds to the synchronizing separator circuit 5a included in the conventional focus evaluating value generating circuit 5 shown in FIG. 2, which separates a vertical synchronizing signal VD and a horizontal synchronizing signal HD from the inputted luminance signal, to apply the same to a gate control circuit 5b'. The gate control circuit 5b' corresponds to the gate control circuit 5b included in the focus evaluating value generating circuit 5 shown in FIG. 2, which is responsive to the inputted vertical synchronizing signal VD and horizontal synchronizing signal. HD and a fixed output of an oscillator (not shown) for setting a sampling area in the center of a picture. The gate control circuit 5b' applies a signal for opening or closing-a gate-every field to the gate circuit 5c' such that the passage of the luminance signal is permitted in the range-of the sampling area. The gate circuit 5c' corresponds to the gate circuit 5c included in the focus evaluating value generating circuit 5 shown in FIG. 2, which is responsive to the signal from the gate control circuit 5b' for applying only a luminance signal corresponding to the range of the sampling area to first and second filter circuits 15 and 16 every field. Both the first and second filter circuits 15 and 16 correspond to the high-pass filter 5d included in the conventional focus evaluating value generating circuit 5 shown in FIG. 2, each of which extracts only a high frequency component of the luminance signal supplied from the image sensing circuit 4 through the gate circuit 5c'. The first filter circuit 15 has a higher cut-off frequency, as compared with that of the second filter circuit 16. According to the present embodiment, it is assumed that the cut-off frequency of the first filter circuit 15 is set to 600KHz-and the cut-off frequency of the second filter circuit 16 is set to 200KHz, for example. Either one of outputs of the first and second filter circuits 15 and 16 is selected by a switching circuit 17 controlled by a focusing motor control circuit 10, to be applied to an accumulating circuit 18. The accumulating circuit 18 corresponds to the detecting circuit 5e, the integration circuit 5f and the A/D converter 5g included in the focus evaluating value generating circuit 5 shown in FIG. 2. In other words, the synchronizing separator circuit 5a', the gate control circuit 5b', the gate circuit 5c', the first filter circuit 15, the switching circuit 17 and the accumulating circuit 18 constitute a first focus evaluating value generating circuit. On, other hand, the synchronizing separator circuit 5a', the gate control circuit 5b', the gate circuit 5c', the second filter circuit 16, the switching circuit 17 and the accumulating circuit 18 constitute a second focus evaluating value generating circuit.

Figure 5:
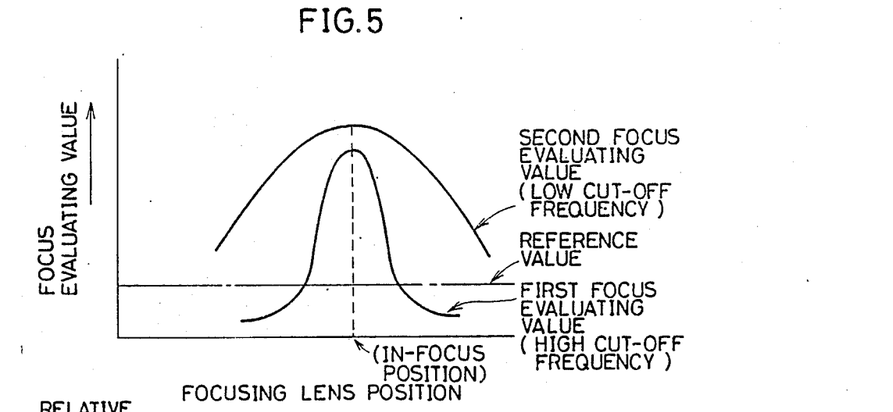
FIG. 5 is a graph showing the relation between the position of a lens and first and second focus evaluating values.

FIG. 5 is a graph showing the relation between the position of the lens the distance between the lens and the object) and outputs of the-first and second focus evaluating value generating circuits. In FIG. 5, an axis of abscissa represents the position of the lens and an axis of ordinate represents the focus evaluating value.

As described above, since the cut-off frequency of the first focus evaluating value generating circuit is higher than that of the second focus evaluating value generating circuit, a mountain-like curve of a focus evaluating value outputted from the first focus evaluating value generating circuit has a steeper shape, as compared with that of a second focus evaluating value outputted from the second focus evaluating value generating circuit.

An output of the accumulating circuit 18 is inputted to a switching circuit 19. The switching circuit 19 is switched in response to a signal from the focusing motor control circuit 10, similarly to the switching circuit 17. As a result, the outputs of the first focus evaluating value generating circuit and the second focus evaluating value generating circuit are inputted to a first in-focus state detecting circuit 20 and a second in-focus state detecting circuit 21, respectively.

Figure 6:
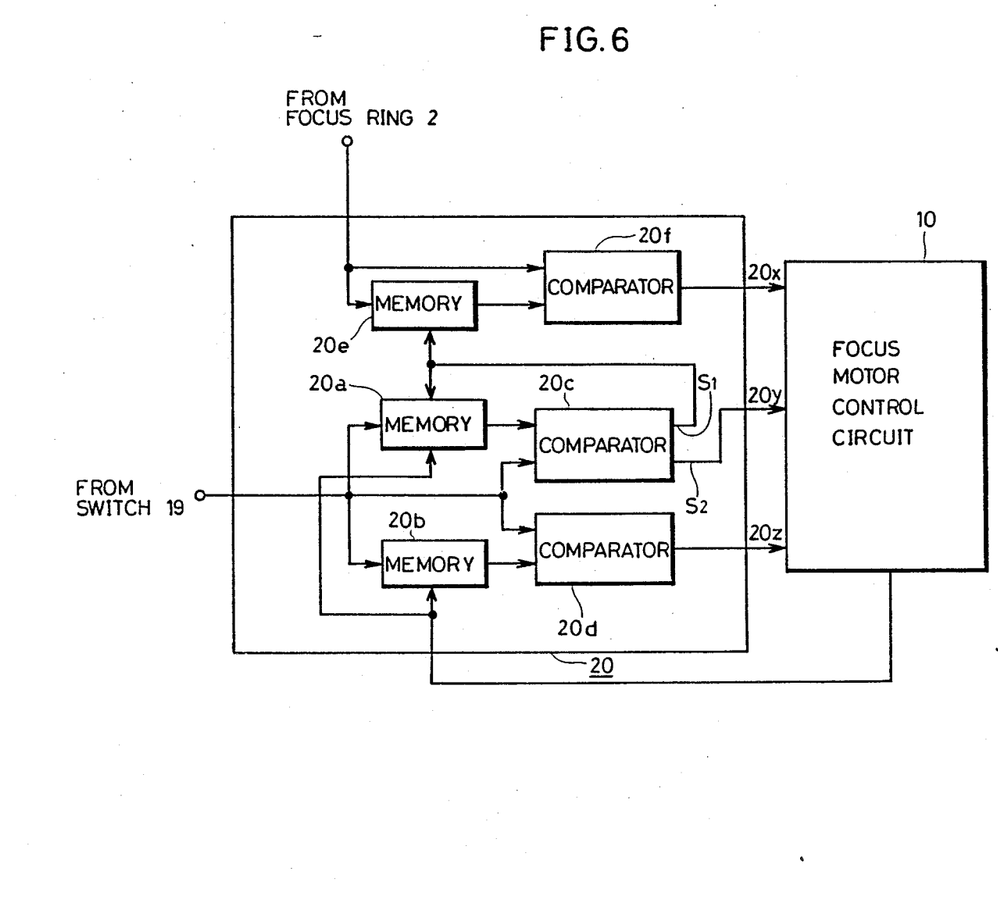
FIG. 6 is a block diagram showing the details of an in-focus state detecting circuit shown in FIG. 4.

The first in-focus state detecting circuit 20 and the second in-focus state detecting circuit 21 have basically the same structure, which is shown in FIG. 6. More specifically, the in-focus state detecting circuit 20 [or 21) comprises a maximum value memory 20a, an initial value memory 20b, a comparator 20c, a comparator. 20d, a focusing ring position, memory 20e and a comparator 20f, which correspond to the maximum value memory 6, the initial value memory 7, the comparator 8, the comparator 9, the focusing ring position memory 13 and the comparator 14, respectively, constituting the conventional automatic focusing apparatus shown in FIG. 1. An operation of the in-focus state detecting circuit 20 (or 21) is clear from the description of the above described automatic focusing apparatus shown in FIG. 1. Briefly stated, immediately after the automatic focusing operation is started, a focus evaluating value corresponding to the first one field supplied from the accumulating circuit 18 through the switching circuit 19 is applied to the maximum value memory 20a and the initial value memory 20b in the in-focus state detecting circuit 20 and held therein. Then, the focusing motor control circuit 10 rotates the focusing motor 3 in a predetermined direction. Thereafter, the comparator 20d compares an initial focus evaluating value held in the initial value memory 20b with the newest focus evaluating value outputted from the accumulating circuit 18, to generate a comparison signal 20z. The focusing motor control circuit 10 responsively initializes the rotational direction of the focusing motor 3.

More specifically, the focusing motor control circuit 10 rotates the focusing motor 3 in the above described predetermined direction until the comparator 20d generates a comparison output indicating "large" or "small". If and when the comparison output 20z indicating that the newest focus evaluating value is larger than the initial focus evaluating value held in the initial value memory 20b is outputted from the comparator 20d, the focusing motor control circuit 10 maintains the above described predetermined rotational direction. On the other hand, when the comparison output 20z indicating that the, current focus evaluating value is smaller than the initial focus evaluating value, the focusing motor control circuit 10 reverses the rotational direction of the focusing motor 3. In the above described manner, initialization of the rotational direction of the focusing motor 3 is completed. Thereafter, the focusing motor control circuit 10 monitors an output 20y of the comparator 20c.

On the other hand, the comparator 20c compares the maximum focus evaluating value so far held in the maximum value memory 20a with the newest focus evaluating value outputted from the accumulating circuit 18, to output two kinds of signals, i.e., a comparison signal S1 indicating that the current focus evaluating value, is "larger" than the focus evaluating value held in the maximum value memory 20a or a comparison signal S2 indicating that the current focus evaluating value is "decreased to be below a predetermined threshold value". If the newest focus evaluating value is larger than the content of the maximum value memory 20a, the content of the maximum value memory 20a is updated in response to the output S1 of the comparator 20c, so that the maximum value of the focus evaluating values so far is always held in the maximum value memory 20a.

On the other hand, a focusing ring position signal generated from the focusing ring 2 is applied to the focusing ring position memory 20e. The focusing ring position memory 20e is updated to always hold a focusing ring position signal obtained when the focus evaluating value is the maximum., in response to the output S1 of the comparator 20c.

The focusing motor control circuit 10 monitors the output 20y of the comparator 20c while rotating the focusing motor 3 in the direction initialized in response to the output 20z of the comparator 20d as described above. When the comparison output S2 indicating that the newest focus evaluating value is decreased to be below the above described threshold value, as compared with the maximum focus evaluating value is obtained from the comparator 20c, the focusing motor control circuit 10 reverse the rotational direction of the focusing motor 3. After the focusing motor 3 is reversed, the content of the focusing ring position memory 20e corresponding to the maximum value of the focus evaluating value and the current focusing ring position signal generated from the focusing ring 2 are compared with each other in the comparator 20f. When both coincide with each other, i.e., the focusing ring 2 is returned to the position where the focus evaluating value is the maximum, the focusing motor control circuit 10 stops rotation, of the focusing motor 3 in response to the output 20x of the comparator 20f. At the same time, the focusing motor control circuit 10 outputs a lens stop signal LS.

The second in-focus state detecting circuit 21 has the same structure as that of the above described first in-focus state detecting circuit 20. Outputs 21x, 21y and 21z of the second in-focus state detecting circuit 21 correspond to outputs 20x, 20y and 20z of the first in-focus state detecting circuit 20, respectively.

The switching circuits 17 and 19 are controlled to be switched every one field in response to the output of the focusing motor control circuit 10 such that the outputs of the first and second filter circuits 15 and 16 are alternately accumulated by the accumulating circuit 18 and applied to the first and second in-focus state detecting circuits 20 and 21, respectively. Consequently, the first focus evaluating value corresponding to one field from the first focus evaluating value generating circuit is inputted to the first in-focus state detecting circuit 20 through the switching circuit 19 and then, the second focus evaluating value corresponding to the next one field from the second focus evaluating value generating circuit is inputted to the second in-focus state detecting circuit 21 through the switching circuit 19. The focusing motor control circuit 10 controls rotation of the focusing motor 3 every one field in response to the-signals 20x, 20y and 20z outputted from the first in-focus state detecting circuit 20 and the signals 21x, 21y and 21z outputted from the second in-focus state detecting circuit 21.

Furthermore, a memory 11 and a comparator 12 are used for resuming an automatic focusing operation by the focusing motor control circuit 10 if the focus evaluating value changes in excess of a predetermined threshold value while the focusing-lens is stopped. More specifically, a focus evaluating value at the time point when the automatic focusing operation by the focusing motor control circuit 10 is terminated and the lens stop signal LS is generated is held in the memory 11. The comparator 12 compares the content of the memory 11 with the newest focus evaluating value outputted from the accumulating circuit 18. If the difference therebetween exceeds a predetermined threshold value, it is considered that the object changed, so that a signal indicating that an object changed is applied to the focusing motor control circuit 10. As a result, the automatic focusing operation by the focusing motor control circuit 10 is resumed, so that the automatic focusing operation following the change of the object is achieved.

When the comparator 12 detects the change of the object, the focusing motor control circuit 10 controls to switch the switching circuits 17 and 19 such that only the second focus evaluating value from the second focus evaluating value generating circuit is selected and inputted to the second. in-focus state detecting circuit 21. More specifically, the focusing motor control circuit 10 switches the switching circuits 17 and 19 such that the second focus evaluating value from the second focus evaluating value generating circuit is selected if input to the focusing motor control circuit 10 at the time point when the in-focus state is achieved is based on the first focus evaluating value while holding the switching circuits 17 and 19 in the current state if input to the focusing motor control circuit 10 is based on the second focus evaluating value.

Thus, whichever contacts in the, switching circuits 17 and 19 are selected at the time point when the in-focus state is achieved so that the automatic focusing operation is terminated, the automatic focusing operation is always performed in response to the second focus evaluating value having a gentle mountain-like curve when the automatic focusing operation is resumed. More specifically, as shown in FIG. 5, since a focus evaluating value having a certain degree of magnitude is obtained using the second focus evaluating value even if the lens is significantly displaced from the in-focus position so that an object is defocused, an automatic focusing operation by hill-climbing control can be surely resumed. After the automatic focusing operation is resumed, the focusing motor control circuit 10 performs the automatic focusing operation while switching the switching circuits 17 and 19 every one field.

Figure 7:
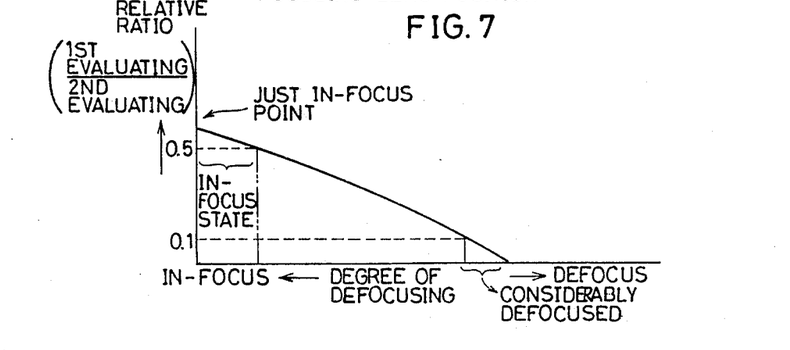
FIG. 7 is a graph showing the relation between the relative ratio of the first focus evaluating value to the second focus evaluating value and the in-focus state of an object.

Additionally, a calculating circuit 22 is responsive to the first and second focus evaluating values outputted from the switching circuit 19 for always calculating the relative ratio of the newest first focus evaluating value to the newest second focus evaluating value FIG. 7 is a graph showing the relation between the relative ratio (the first focus evaluating value/the second focus evaluating value) and the. in-focus state of the object. In FIG. 7, an axis of abscissa represents the degree of defocusing, i.e., the amount of movement of the lens from the in-focus position, and an axis of ordinate represents the above described relative ratio. As shown in FIG. 7, the relative ratio and the degree of defocusing are represented by a monotonically decreasing characteristic curve. More specifically, as the object is defocused from the in-focus state, the outputs of the first and second filter circuits are attenuated from high-frequency components thereof, the degree of attenuation being in one-to-one correspondence to the degree of defocusing. When the above described relative ratio at a particular time point is calculated, the relative ratio becomes a value indicating the in-focus state of the object at that time point., similarly to the focus evaluating value. More specifically, the above described relative ratio is a function indicating the in-focus state of the object. In addition, the relative ratio is a kind. of normalized quantity of state because it is expressed as a percentage. Thus, such a relative ratio is not so affected by the environment in which the object is located, so that the in-focus state can be accurately indicated. For example, if the luminance of the object changes, the absolute value of the focus evaluating value changes. However, the above described relative ratio does not change greatly. In addition, the nature inherent to such a relative ratio is independent of the type of the object. Thus, in the present invention, as another parameter indicating the in-focus state, i.e., the degree, of defocusing, the above described relative ratio is used in addition to the focus evaluating value.

Turning to FIG. 4, a comparator 23 compares-the relative ratio calculated by the, calculating circuit 22 with a threshold value. (0.5 in the example shown in FIG. 7) previously set in a threshold value holding circuit 24. The result of comparison is applied to the focusing motor control circuit 10, to control the rotational speed of the focusing motor 3.

More specifically, when it is determined that the newest relative ratio calculated by the calculating circuit 22 is smaller than the threshold value set in the threshold value holding circuit 24, the focusing motor control circuit 10 generates a control signal NSP instructing a normal speed mode, to apply the same to the focusing motor 3. The focusing motor 3 responsively rotates at normal speed. On the other hand, when it is determined that the calculated relative ratio is larger than the above described threshold value, the focusing motor control circuit 10 generates a control signal LSP instructing a low speed mode, to apply the same to the focusing motor 3. The focusing motor 3 responsively rotates at lower speed than the above described normal speed.

Thus, when the relative ratio is smaller than the threshold value and the object is in the defocused state, the lens 1 is moved at high speed. On the other hand, when the relative ratio is larger than the threshold value and the lens is in the vicinity of the in-focus position and thus, the change of the focus evaluating value relative to the movement of the lens is small, the lens 1 is moved at low speed. As a result, overrun to occur when the focusing motor 3 is reversed in response to the output S2 of the comparator. 20c can be controlled to be small.

Although in the above described embodiment, the first focus evaluating value and the second focus evaluating value are alternately selected, the first focus evaluating value and the second focus evaluating value may be selected such that there is one different focus evaluating value every three fields. For example, first focus evaluating value, the first focus evaluating value, the second focus evaluating value, the first focus evaluating value, the first focus evaluating value, the second focus evaluating value, ... .

In addition, similar effects can be obtained if the first and second focus evaluating values are used for only the rotational speed control of the focusing motor; while employing another system for automatic focusing operation itself.

As described in the foregoing, according to the first embodiment of the present invention, since the degree of defocusing of the object is detected in a normalized state and response characteristics of the automatic focusing operation can be arbitrarily set depending on the degree defocusing, a high-speed and stable automatic focusing operation can be performed.

Figure 8:
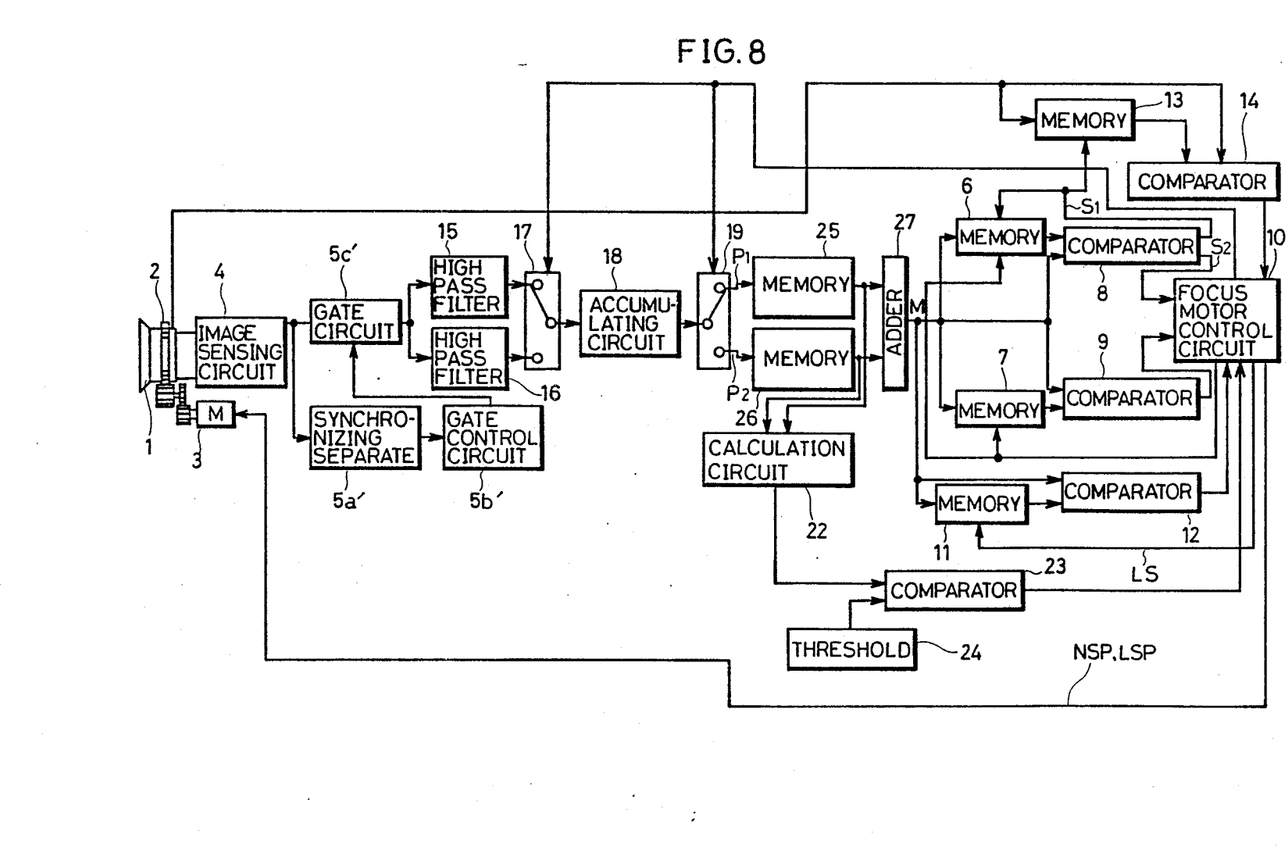
FIG. 8 is a schematic block diagram showing an automatic focusing apparatus according-to a second embodiment of the present invention.

FIG. 8 is a schematic block diagram showing an automatic focusing apparatus according to a second embodiment of the present invention.

In the automatic focusing apparatus shown in FIG. 8, a focusing lens 1, a focusing ring 2, a focusing motor 3, an image sensing circuit 4, a synchronizing separator circuit 5a', a gate control circuit 5b', a gate circuit 5c', first and second filter circuits 15 and 16, switching circuits 17 and 19, an accumulating circuit 18, a focusing motor control circuit 10, a memory 11, comparators 12 and 23, a calculating circuit 22, and a threshold value holding circuit 24 are the same; as the components represented by corresponding reference numerals in the first embodiment shown in FIG. 4, and a maximum value memory 6, an initial value memory 7, comparators 8, 9 and 14, and a ring position memory 13 are the same as the components represented by corresponding reference numerals in the conventional example shown in FIG. 1 and hence, the detailed description thereof is omitted. Thus, the automatic focusing apparatus shown in FIG. 8 is the same as the automatic focusing apparatus shown in FIGS. 1 and 4 except for the following.

More specifically, outputs of the switching circuit 19 are coupled to memories 25 and 26. Switching of the switching circuit 19 is achieved every one field in synchronization with switching of the switching circuit 17 in response to a switching control signal from the focusing motor control circuit 10, so that a value P1, obtained by integrating an output of the first filter circuit 15 with respect to one field by the accumulating circuit 18 is held in the memory 25 while a value P2, obtained by integrating an output of the second filter circuit 16 with respect to one field by the accumulating circuit 18 is held in the memory 26. More specifically, an integrated value corresponding to an odd field is updated every one frame in the memory 25 while an integrated value corresponding to an even field is updated every one frame in the memory 26.

Figure 9:
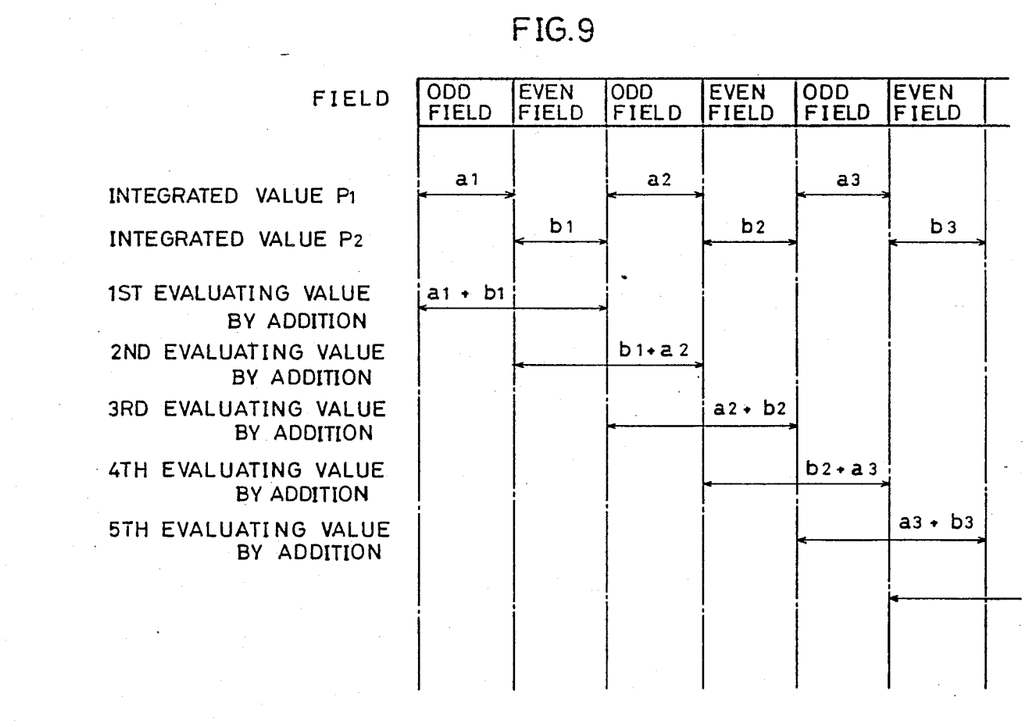
FIG. 9 is a diagram for explaining the process of calculation in an adder shown in FIG. 8.

Furthermore, outputs of the memories 25 and 26 are applied to an adder 27 and the calculating circuit 22. More specifically, the adder 27 adds every one field the integrated values P1 and P2 held in the memories 25 and 26, to output a value obtained by addition as a focus evaluating value M. FIG. 9 is a diagram for explaining the process of the calculation in the adder 27. As shown in FIG. 9, the integrated value P1 corresponding to the odd field held in the memory 25 changes such as $a_1$, $a_2$, $a_3$, ..., while the integrated value P2 corresponding to the even field held in the memory 26 changes such as $b_1$, $b_2$, $b_3$, .... The evaluating value M obtained by addition from the adder 27 sequentially changes every field such that the first evaluating value by addition is $(a_1+b_1)$, the second is $(b_1+a_2)$, the third is $(a_2+b_2)$, the fourth is $(b_2+a_3)$, the fifth is $(a_3+b_3)$ .... More specifically, since a value obtained by adding an integrated value of either one of the outputs of the first and second filter circuits 15 and 16, corresponding to the current field to an integrated value of the other output corresponding to the previous one filed is used as a focus evaluating value corresponding to the current filed, variation in focus evaluating value every field caused by the above described interlaced scanning is eliminated. Moreover, a stable focus evaluating value can be obtained in which the effect of noise is migrated.

When the automatic focusing operation is started, the first focus evaluating value M obtained by addition is applied to the maximum value memory 6 and the initial value memory 7, to be held therein. The details of the subsequent automatic focusing operation performed using the memories 6, 7, 13 and 11 and the comparators 8, 9, 12 and 14 have been already described with reference to the conventional example shown in FIG. 1 and the first embodiment shown in FIG. 4 and hence, the description thereof is omitted.

Furthermore, the calculating circuit 22 calculates the relative ratio of the integrated value P2 to the integrated value P1, i.e., the integrated value P1'/the integrated value P2, as in the first embodiment shown in FIG. 4, in response to the integrated values held in the memories 25 and 26. The relation between the relative ratio and the in-focus state of the object is as shown in FIG. 7. In addition, the characteristics of the relative ratio have been already described in detail with reference to FIG. 7. Thus, the rotational speed of the focusing motor 3 is controlled using separately the relative ratio as a parameter indicating the degree of defocusing, as in the first embodiment shown in FIG. 4. More specifically, when it is determined that the newest ratio calculated by the calculating circuit 22 is smaller than the threshold value set in the threshold value holding circuit 24, the focusing motor control circuit 10 generates a control signal NSP instructing a normal speed mode, to apply the same to the focusing motor 3. The focusing motor 3 responsively rotates at normal speed. On the other hand, when it is determined that the calculated relative ratio is larger than the above described threshold value, the focusing motor control circuit 10 generates a control signal LSP instructing a low speed mode, to apply the same to the focusing motor 3. The focusing motor 3 responsively rotates at lower speed than the above described normal speed.

As described in the foregoing, according to the second embodiment of the present invention, even if a plurality of filters are switched every field in a time divisional manner using video components in different bands as focus evaluating values, the number of times of sampling for monitoring the maximum values of the focus evaluating values can be satisfactorily ensured. In addition, even when the object is defocused so that a focus evaluating value is low, a focus evaluating value including a high frequency component by addition which steeply changes relative to the position of the lens is used, so that hill-climbing control can be performed more precisely, as compared with a case in which hill-climbing control is performed using a focus evaluating value including a low frequency component which gently changes relative to the position of the lens.

Figure 10:
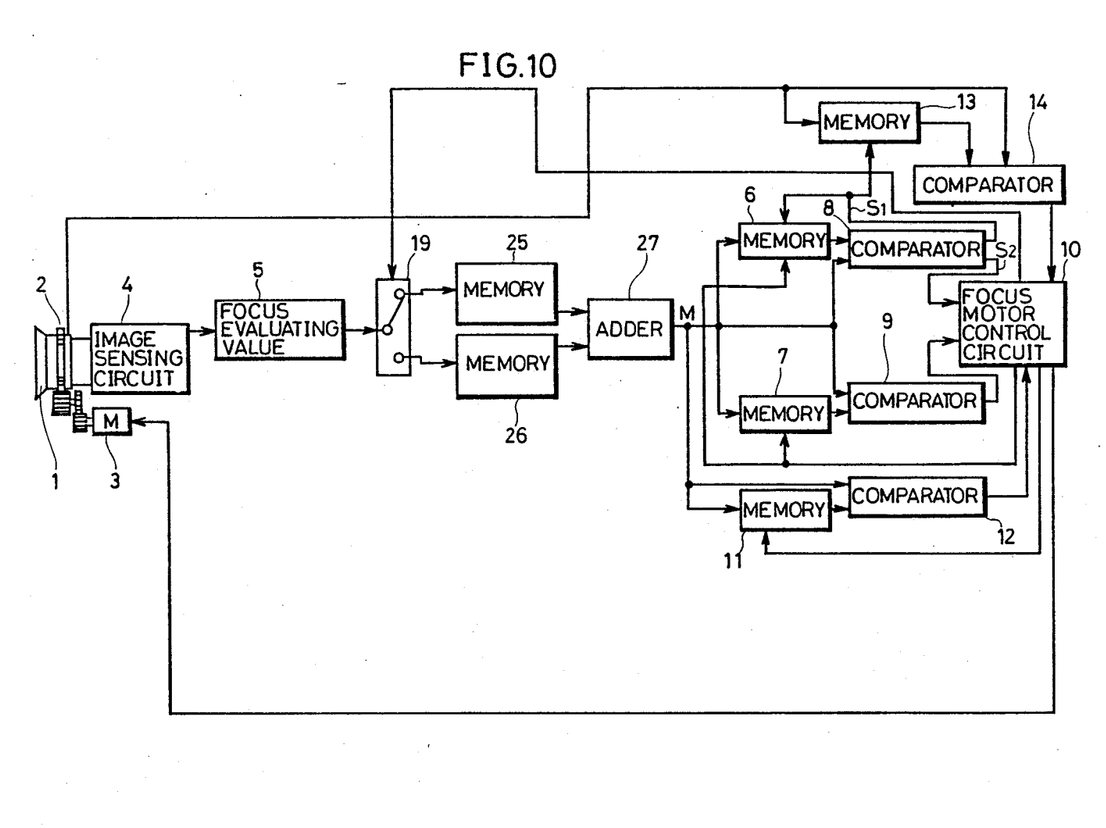
FIG. 10 is a schematic block diagram showing an automatic focusing apparatus according to still another embodiment of the present invention.

Additionally, in the above described second embodiment, since the relative ratio for controlling the rotational speed of the focusing motor must be calculated, two filter circuits having different cut-off frequencies are employed. Thus, integrated values of outputs of different filter circuits, corresponding to the newest continuous two fields are added. A value obtained by addition is used as a focus evaluating value. However, when the above described relative ratio need not be calculated, only one filter circuit is sufficient to calculate the focus evaluating value. FIG. 10 shows an automatic focusing apparatus according to another embodiment of the present invention. In such a case that the relative ratio need not be calculated, if the integrated values of an output of the focus evaluating value generating circuit 5 comprising one filter circuit, corresponding to the newest continuous two fields are added and the obtained value is updated every one field, a high-precise focus evaluating value is obtained. In addition, an output of an adder 27 may be divided by two to take an average as one field. The obtained average value may be also used as a focus evaluating value.

Although in the above described first and second embodiments, the speed of the focusing motor is set to a two-stage mode comprising a normal speed mode and a low speed mode to control the speed, the speed can be more finely set to a several-stage mode to control the speed of the focusing motor more frequently.

Although in the above described embodiments, a case as described in which a signal which takes the maximum value in the in-focus position is used as a focus evaluating value, a signal which takes the minimum value in the in-focus position may be used as a focus evaluating value and a circuit for detecting the minimum value may be provided to perform control such that the minimal value of the detected value is maintained, in which case the same effect can be obtained.

In addition, operations according to the above described embodiments can be easily processed in a software manner by a microprocessor.

Additionally, although in the above-described embodiments, the focusing ring position signal generated from the focusing ring 2 is held in the focusing ring position memory 13 so that a focusing ring position signal corresponding to the maximum value of the focus evaluating value and the current focusing ring position signal are compared with each other by the comparator 14, the focusing motor position signal may be detected from the focusing motor 3 to be substituted for the focusing ring position signal, in which case the same effect can be obtained.

Additionally, focus evaluating values may be detected not every one field but every one frame.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic focusing apparatus for automatically matching the focus relative to an object in response to a video signal obtained from image sensing means having a focusing lens (1) and an image sensor, comprising:

relative position changing means (2,3) for changing the relative position in the direction of an optical axis of said focusing lens relative to said image sensor, first focus evaluating value detecting means (5a', 5b', 5c', 15, 17, 18) for detecting every constant time period a level of a first high frequency component of the video signal obtained from said image sensing means and converting the level into a first focus evaluating value which changes in response to the change of the relative position of said focusing lens, second focus evaluating value detecting means (5a', 5b', 5c', 16, 17, 18) for detecting every constant time period a level of a second high frequency component including said first high frequency component and a component at a level which is lower than the level of said first high frequency component of the video signal obtained from said image sensing means and converting the level into a second focus evaluating value which changes at a lesser rate than said first focus evaluating value in response to the change of the relative position of said focusing lens, both said first and second focus evaluating values being respective focus evaluating values which reach corresponding maximum values in an in-focus position, control means (6, 7, 8, 9, 10, 13, 14, 20, 21) for controlling said relative position changing means such that the relative position of said focusing lens is driven to the in-focus position, means (22) for calculating a relative ratio of said first focus evaluating value to said second focus evaluating value, means (23, 24) for comparing said relative ratio with a predetermined value, means (10) responsive to an output of said comparing means for setting the speed of movement of the relative position of the focusing lens.

2. The automatic focusing apparatus according to claim 1, further comprising, a third focus evaluating value detecting means (19, 25, 26, 27) responsive to said first and second focus evaluating values for generating a third focus evaluating value which takes a maximum value in the in-focus position, and said control means being responsive to said third focus evaluating value to control said relative position changing means such that the relative position of said focusing lens is driven to the position where said third focus evaluating value takes the maximum value associated therewith.

3. The automatic focusing apparatus according to claim 2, wherein said third focus evaluating value detecting means comprises switching means,(19) for alternately selecting said first and second focus evaluating values respectively outputted from said first and second focus evaluating value detecting means every constant time period and to output a selected value as said third focus evaluating value.

4. The automatic focusing apparatus according to claim 3, wherein said control means comprises first in-focus state detecting means (20) responsive to said third focus evaluating value supplied from said switching means for detecting the, relative position of the focusing lens where said first focus evaluating value takes the maximum value associated therewith, second in-focus state detecting means (21) responsive to said third focus evaluating value supplied from said switching means for detecting the relative position of the focusing lens where said second focus evaluating value associated therewith takes the maximum value, and means (10) responsive to outputs of said first and second in-focus state detecting means for generating a signal for controlling said relative position changing means such that the relative position of said focusing lens is driven to said detected position.

5. The automatic focusing apparatus according to claim 2, wherein said third focus evaluating value detecting means comprises switching means (19) for alternately selecting said first and second focus evaluating values respectively outputted from said first and second focus evaluating value detecting means every said constant time period., first memory means (25) for holding the first focus evaluating value selected by said switching means, second memory means [26] for holding the second focus evaluating value selected by said switching means, and adding means (27) for adding newest contents of said first and second memory means every said constant time period to output a value obtained by addition as said third focus evaluating value.

6. The automatic focusing apparatus according to claim 1, wherein said speed setting means sets said speed of movement to a first speed when it is determined that said calculated relative ratio is smaller than said predetermined value and sets said speed of movement to a second speed that is less than said first speed when it is determined that said calculated relative ratio is larger than said predetermined ratio.

7. The automatic focusing apparatus according to claim 2, wherein said control means comprises means (10) for controlling the focusing lens relative position changing means such that the relative position of said focusing lens is once fixed to the position where said third focus evaluating value takes the maximum value associated therewith, object change detecting means (11, 12) responsive to the change of said third focus evaluating value, for detecting the change of said object, and means (10) for always resuming control of the relative position of said focusing lens when said object change detecting means detects the, change of said object.

8. The automatic focusing apparatus according to claim 1, wherein said first and second focus evaluating value detecting means share.

synchronizing signal separating means (5a') for separating a vertical synchronizing signal and a horizontal synchronizing signal from said video signal, and gate means (5b', 5c') for passing every said constant time period said video signal within a sampling area set in response to said vertical synchronizing signal and said horizontal synchronizing signal separated by said synchronizing signal separating means.

9. The automatic focusing apparatus according to claim 8, wherein said first focus evaluating value detecting means comprises first filter means 15) for extracting a level of said first high frequency component of the video signal which passed through said gate means, and said second focus evaluating value detecting means comprises second filter means (16) for extracting a level of said second high frequency component of the video signal which passes through said gate means.

10. The automatic focusing apparatus according to claim 9, wherein said first and second focus evaluating value detecting means share means (18) for integrating the level of the high frequency component of the video signal extracted by said first and second filter means to yield an integrated level and converting the integrated level into a-digital signal.

11. The automatic focusing apparatus according to claim 1, wherein said relative position changing means comprises a focusing ring (2) and a focusing motor, (3) for moving the focusing lens in the direction of the optical axis.

12. The automatic focusing apparatus according to claim 1, wherein said relative position changing means comprises a piezoelectric element for moving the focusing lens or the image sensor in the direction of the optical axis.

13. The automatic focusing apparatus according-to claim 1, wherein said constant time period is a time period corresponding to one field of said video signal.

14. The automatic focusing apparatus according to claim 1, wherein said constant time period is a time period corresponding to one frame of said video signal.

15. The automatic focusing apparatus for automatically matching the focus relative to an object in response to a video signal obtained from image sensing means having a focusing lens (1) and an image sensor, comprising:

relative position changing means (2, 3) for changing the relative position in the direction of an optical axis of said focusing lens relative to said image sensor, focus evaluating value detecting means for detecting every constant time period a level of a high frequency component of the video signal obtained from said image sensing means and converting the level into a focus evaluating value which takes a maximum value in an in-focus position, focus evaluating value adding means (19, 25, 26, 27) for adding during said every constant time period two focus evaluating values, each of which was obtained during a respective constant time period, to sequentially supply a focus evaluating value obtained by addition, and control means (6, 7, 8, 9, 10, 13, 14) responsive to said focus evaluating value obtained by addition for controlling said relative position changing means such that the relative position of said focusing lens is driven to a position where said focus evaluating value obtained by addition takes a maximum value associated therewith.

16. The automatic focusing apparatus according to claim 15, wherein said focus evaluating value adding means comprises switching means (19) for alternately selecting the focus evaluating values outputted from said focus evaluating value detecting means every said constant time period, first memory means (25) for holding the focus evaluating value selected by said switching means, second memory means (26) for holding the focus evaluating value selected by said switching means, and adding means 27) for adding said every constant time period the newest contents of said first and second memory means to output a value obtained by addition.

17. The automatic focusing apparatus according to claim 15, wherein said control means comprises means (10) for controlling the focusing lens relative position changing means such that the relative position of said focusing lens is once fixed to the position where said focus evaluating value obtained by addition takes, the maximum value, object change detecting means (11, 12) responsive to the change of said focus evaluating value obtained by addition for detecting the change of said object, means (10) for always resuming control of the relative position of said focusing lens when said-object change detecting means detects the change of said object.

18. The automatic focusing apparatus according to claim 15, wherein said focus evaluating value detecting means comprises synchronizing signal separating means (5a) for separating a vertical synchronizing signal and a horizontal synchronizing signal from said video signal, and gate means (5b, 5c) for passing said every constant time period said video signal within a sampling area set in response to said vertical synchronizing signal and said horizontal synchronizing signal separated by said synchronizing signal separating means.

19. The automatic focusing apparatus according to claim 18, wherein said focus evaluating value detecting means comprises filter means (5b) for extracting a level of the high frequency component of the video signal which passed through said gate means.

20. The automatic focusing apparatus according to claim 19, wherein said focus evaluating value detecting means comprises means for integrating the level of the high frequency component of the video signal extracted by said filter means to yield an integrated level and converting the integrated level into a digital signal.

21. The automatic focusing apparatus according to claim 15, wherein said relative position changing means comprises a focusing ring (2) and a focusing-motor (3) for moving a focusing lens in the direction of an optical axis.

22. The automatic focusing apparatus according to claim 15, wherein said focusing lens position changing means comprises a piezoelectric element for moving the focusing lens or the image sensor in the direction of the optical axis.

* * * * *